Dec. 31, 1935. M. H. SALZMAN 2,026,362
BUDGET BOX
Filed Feb. 18, 1935
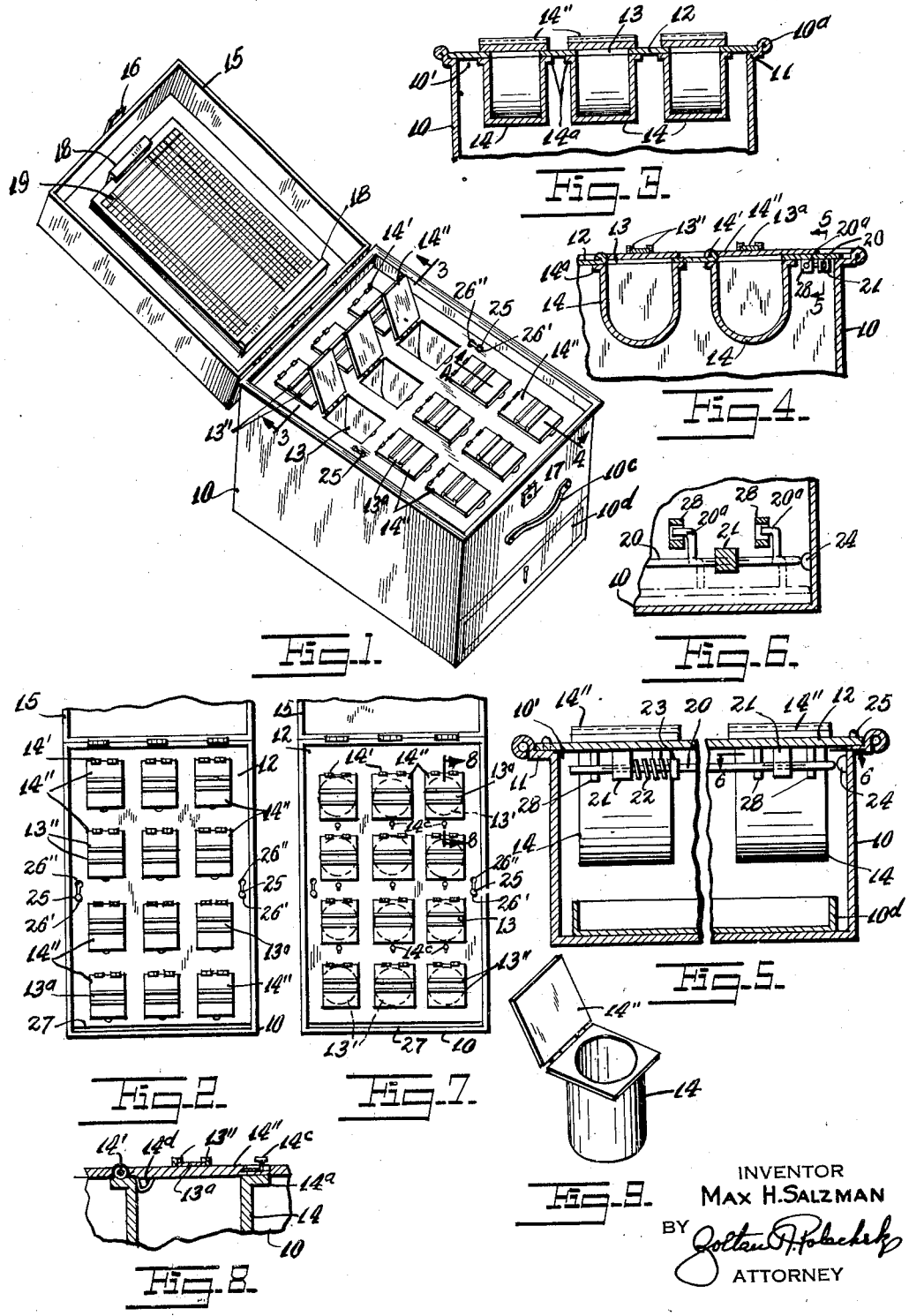
INVENTOR
Max H. Salzman
BY
ATTORNEY Patented Dec. 31, 1935

2,026,362

UNITED STATES PATENT OFFICE 2,026,362

BUDGET BOX

Max H. Salzman, New York, N. Y.

Application February 18, 1935, Serial No. 7,062

3 Claims. (Cl. 232—1)

This invention relates to new and useful improvements in a budget box.

The invention has for an object the construction of a device as mentioned which is characterized by a container with an open top, a removable plate closing said top and formed with a plurality of openings, and pockets attached on the bottom of said plate beneath said openings so that the openings form the mouths for the pockets.

Still further the invention contemplates the provision of a cover closing each of said pockets. It is proposed that the various pockets be used for holding money for different purposes; such as one compartment for the budget allowance for food, another for clothes, still another for emergencies, etc.

More particularly, the invention contemplates the provision of a flange surrounding the top of the container, and an arrangement whereby the removable plate has its edges resting on the flange so as to be readily removable.

Another object of the invention is the provision of a cover for closing the container in such a manner as to cover all of the pockets.

Still further, it is proposed to provide certain of the pockets with latching means so that they may be latched close.

Another object of the invention is the provision of a novel automatic means for latching the covers mentioned in the previous paragraph closed when the plate is in one position, and automatically open the same when the plate is in another position.

It is further proposed to construct an article as described which is simple and durable and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this invention:—

Fig. 1 is a perspective view of a budet box constructed according to this invention.

Fig. 2 is a fragmentary plan view of Fig. 1.

Fig. 3 is a transverse sectional view taken on the line 3—3 of Fig. 1.

Fig. 4 is a fragmentary longitudinal sectional view taken on the line 4—4 of Fig. 1.

Fig. 5 is a fragmentary enlarged sectional view taken on the line 5—5 of Fig. 4.

Fig. 6 is a fragmentary horizontal sectional view taken on the line 6—6 of Fig. 5.

Fig. 7 is a view similar to Fig. 2 but illustrating another embodiment of the invention.

Fig. 8 is a fragmentary vertical sectional view taken on the line 8—8 of Fig. 7.

Fig. 9 is a perspective view of a modified form of pocket.

The budget box according to this invention, comprises a container 10 made of any suitable material and formed with an open top 10' and having a flange 11 surrounding said open top. A removable plate 12 closes the open top and rests upon the flange 11 and is formed with a plurality of openings 13. Pockets 14 are attached upon the bottom of the plate 12 beneath the openings 13 so that the openings comprise mouths for the pockets. A cover 14'' closes each of the openings 13.

The form of the openings 13, pockets 14 and cover may be shaped as desired and a pair of guides 13'' are provided to hold an interchangeable name plate 13$^a$ in position. A drawer 10$^b$ may be also provided at the bottom of container 10 and a carrying handle 10$^c$ is secured to the said container.

A large cover 15 is hingedly mounted on one side of the container 10 for the purpose of covering the pockets enclosing the budget box. The cover 15 is provided with a lock 16 adapted to coact with a keeper 17 on the container 10 so that the budget box may be latched closed. A pair of opposed support elements or tracks 18 are mounted on the inner side of the cover 15 for holding budget charts 19 or similar data. The edges 10$^a$ of the container are turned, as clearly shown in Fig. 3, so as to produce a satisfactory finished edge. The flange 10 is formed by merely bending the material of the sides of the container. The pockets 14 are formed with small flanges 14$^a$ by which the pockets are attached to the underside of the plate. The pockets 14 may also be integral with the plate 12. The small covers 14'' are hingedly mounted at one of their ends 14' in a manner so that they may be readily opened and closed.

A transverse row of the covers 14 may be latched closed if desired. The latter comprises a transverse latch bar 20 transversely slidably in standards 21 mounted upon the bottom side of the plate 12. An expansion spring 22 acts against one side of one of the standards 21 and a collar 23 on the latch bar 20 in a manner so as to urge the latch bar in one direction, more particularly, towards the right hand side of Fig. 5.

The right hand end of the latch bar 21 is adapted to engage against a cam projection 24 in one position of the cover 12. The cover 12 is adapted to assume two positions, as determined by a pair of dowel pins 25 projecting from the flanges 11 and engageable with openings 26' or 26''.

It should be noted that the plate 12 is slightly shorter than the length of the container (note the space 27) so that the plate may be placed with the stationary dowel pins 25 engaged through the openings 26' or the openings 26'' to hold the plate in one or the other position. In one of the positions the end of the latch rod 20 engages the cam projection 24. In the other of the positions, indicated by the dot and dash lines in Fig. 6, the latch rod 20 will be free, and will be moved to an inoperative position by the spring 22.

The covers 14'' are provided with eye-shaped keeper elements 28 which engage through openings in the plate 12 to the underside of the plate. These eye-shaped keeper elements 28 may be engaged by bolt fingers 20ª projecting from the latch bar 22 when the bar is in the operative position as held by the cam projection 24. The covers 14'' are shown in the latched position in Figs. 5 and 6. They may not be opened unless the plate 12 is first lifted and freed from the dowel pins 25 and moved into the second mentioned position.

In Fig. 7 another embodiment of the invention has been disclosed which is substantially identical to the preferred form except for the fact that the plate 12 is formed with circular shaped openings 13, and spring 14ª is provided to open cover 14'' when the handle of latch of 14ᶜ is moved in the direction of the arrow (see Fig. 8). This figure is shown to illustrate the fact that various mechanical changes may be made in the device.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A budget box, comprising a container with an open top having a flange surrounding said top, a removable plate closing said top and resting on said flange and adapted to be shifted slightly and having a plurality of openings, pockets attached on the bottom of said plate beneath said openings so that the openings form mouths for the pockets, and covers closing said openings, and means for holding said covers locked in one of the shifted positions of said plate.

2. A budget box, comprising a container with an open top having a flange surrounding said top, a removable plate closing said top and resting on said flange and having a plurality of openings, pockets attached on the bottom of said plate beneath said openings so that the openings form mouths for the pockets, covers closing said openings, eye keepers projecting from a transverse row of said covers and engaging through openings in said removable plate to extend below the plate, a bolt transversely slidably mounted on the bottom of said plate and having off-set finger bolt portions engageable with said eye keepers, a cam on said container for projecting said bolt into a latching position, and means for coacting with the container and plate for holding said plate in one position in which the bolt engages the cam, and a second position in which the bolt is free from the cam.

3. A budget box, comprising a container with an open top having a flange surrounding said top, a removable plate closing said top and resting on said flange and having a plurality of openings, pockets attached on the bottom of said plate beneath said openings so that the openings form mouths for the pockets, covers closing said openings, eye keepers projecting from a transverse row of said covers and engaging through openings in said removable plate to extend below the plate, a bolt transversely slidably mounted on the bottom of said plate and having off-set finger bolt portions engageable with said eye keepers, a cam on said container for projecting said bolt into a latching position, and means for coacting with the container and plate for holding said plate in one position in which the bolt engages the cam, and a second position in which the bolt is free from the cam, said means comprising dowel pins projecting from said flange and engageable in certain openings in the plate for holding the plate in the one position, or other openings in the plate for holding it in the other position.

MAX H. SALZMAN.